US000001467H

United States Statutory Invention Registration [19]

[11] Reg. Number: H1467

[43] Published: Aug. 1, 1995

Prieto et al.

[54] DETERGENT FORMULATIONS CONTAINING A SURFACE ACTIVE COMPOSITION CONTAINING A NONIONIC SURFACTANT COMPONENT AND A SECONDARY ALKYL SULFATE ANIONIC SURFACTANT COMPONENT

[75] Inventors: Nelson E. Prieto, Richmond; Kirk H. Raney, Sugar Land; Werner Lilienthal, Houston, all of Tex.

[73] Assignee: Shell Oil Company, Houston, Tex.

[21] Appl. No.: 153,385

[22] Filed: Nov. 16, 1993

[51] Int. Cl.[6] ..... C11D 7/18; C11D 7/38; C11D 7/56

[52] U.S. Cl. ..... 252/99; 252/94; 252/95; 252/140; 252/549; 252/550; 252/174.21; 252/174.22; 252/135; 252/174.12

[58] Field of Search ..... 252/549, 550, 174.21, 252/174.22, 135, 174.12, 94, 95, 99, 140

[56] References Cited

U.S. PATENT DOCUMENTS

| | | | |
|---|---|---|---|
| 3,720,621 | 3/1973 | Smeets | 252/135 |
| 3,838,072 | 9/1974 | Smith et al. | 252/540 |
| 4,052,342 | 10/1977 | Fernley et al. | 252/541 |
| 4,162,994 | 7/1979 | Kowalchuk | 252/532 |
| 4,235,752 | 11/1980 | Rossall et al. | 252/551 |
| 4,316,824 | 2/1982 | Pancheri | 252/551 |
| 4,474,678 | 10/1984 | Lutz et al. | 252/174.21 |
| 4,490,271 | 12/1984 | Spadini et al. | 252/174.23 |
| 4,507,219 | 3/1985 | Hughes | 252/118 |
| 4,556,509 | 12/1985 | Demangeon et al. | 252/542 |
| 4,576,738 | 3/1986 | Colodney et al. | 252/559 |
| 4,595,526 | 6/1986 | Lai | 252/545 |
| 4,604,224 | 8/1986 | Cheng | 252/91 |
| 4,663,069 | 5/1987 | Llenado | 252/117 |
| 4,664,950 | 5/1987 | Wixon | 427/214 |
| 4,666,740 | 5/1987 | Wixon | 427/214 |
| 4,668,423 | 5/1987 | Drozd et al. | 252/174.21 |
| 4,692,275 | 9/1987 | Secemski et al. | 252/534 |
| 4,758,377 | 7/1988 | Iding | 252/556 |
| 4,828,721 | 5/1989 | Bollier et al. | 252/8.7 |
| 4,868,842 | 9/1989 | Denis et al. | 252/121 |
| 4,880,569 | 11/1989 | Leng et al. | 252/550 |
| 4,923,635 | 5/1990 | Simion et al. | 252/545 |
| 4,923,636 | 5/1990 | Blackburn et al. | 252/550 |
| 4,929,379 | 5/1990 | Oldenburg | 252/109 |
| 5,009,804 | 4/1991 | Clayton et al. | 252/90 |
| 5,034,158 | 7/1991 | Merrill et al. | 252/545 |
| 5,035,838 | 7/1991 | Merrill et al. | 252/545 |
| 5,057,238 | 10/1991 | Broze et al. | 252/99 |
| 5,073,293 | 12/1991 | Deguchi et al. | 252/174.17 |
| 5,075,041 | 12/1991 | Lutz | 252/548 |
| 5,078,916 | 1/1992 | Kok et al. | 252/549 |
| 5,082,584 | 1/1992 | Loth et al. | 252/122 |
| 5,091,101 | 2/1992 | Hildreth | 252/89.1 |
| 5,096,622 | 3/1992 | Simion et al. | 252/548 |

FOREIGN PATENT DOCUMENTS

| | | |
|---|---|---|
| 0342177 | 11/1989 | European Pat. Off. . |
| 0399752 | 11/1990 | European Pat. Off. . |
| 884656 | 12/1961 | United Kingdom . |
| 1560073 | 1/1980 | United Kingdom . |
| 2168377 | 6/1986 | United Kingdom . |

*Primary Examiner*—Donald P. Walsh
*Assistant Examiner*—Anthony R. Chi

[57] ABSTRACT

This invention relates to detergent formulations containing a surface active composition comprising one or more nonionic surfactant components and one or more secondary alkyl sulfate anionic surfactant components.

14 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DETERGENT FORMULATIONS CONTAINING A SURFACE ACTIVE COMPOSITION CONTAINING A NONIONIC SURFACTANT COMPONENT AND A SECONDARY ALKYL SULFATE ANIONIC SURFACTANT COMPONENT

FIELD OF THE INVENTION

The present invention relates to detergent formulations containing a surface active composition comprising one or more nonionic surfactant components and one or more secondary alkyl sulfate anionic surfactant components.

BACKGROUND OF THE INVENTION

Linear alkylbenzene sulfonate (LAS) is one of the most widely used surfactants in commerce. It finds special application for light and heavy duty liquid and powder detergents. A potential disadvantage of LAS, however, is that under hard water conditions, i.e., calcium levels greater than about 150 parts per million, it can interact with cationic water hardness ions, such as calcium, thereby becoming inactivated through precipitation. While this is a problem common to anionic surfactants, LAS is especially sensitive to water hardness ions.

Although not wishing to be bound by any theory, the literature indicates that the aforementioned interaction can best be understood by considering the micellar structure of anionic surfactants, e.g., LAS. Repulsive forces between negative charges in the sulfonate group lead to a higher critical micelle concentration (CMC) than, for example, with a nonionic surfactant. CMC is the surfactant concentration at which micellar formation begins. Stated otherwise, the negative charge of LAS retards micellar formation and shifts the equilibrium towards the monomer. A relatively high monomer concentration in solution results thereby; this is significant because precipitation between calcium ion and LAS occurs only with the monomer.

It has been found that detergent formulations containing a surfactant composition comprising one or more nonionic surfactant components and one or more secondary alkyl sulfate compounds as anionic surfactant components can be used in various detergent formulations in place of either linear alkylbenzene sulfonate or primary alkyl sulfates with the advantages being increased tolerance for water hardness ions, good detergency properties, biodegradability, higher active matter content, lower water content, lighter color and good foaming properties.

SUMMARY OF THE INVENTION

The present invention provides a detergent formulation which comprises from about 0.1 percent by weight to about 50 percent by weight, basis the total weight of the detergent formulation, of a surface active composition which contains between about 0.1 percent by weight and about 28 percent by weight, basis the total weight of the surface active composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and between about 0.1 percent by weight and about 35 percent by weight, basis the total weight of the surface active composition, of one or more secondary alkyl sulfate compounds.

DESCRIPTION OF THE PREFERRED EMBODIMENTS

Figure 1:
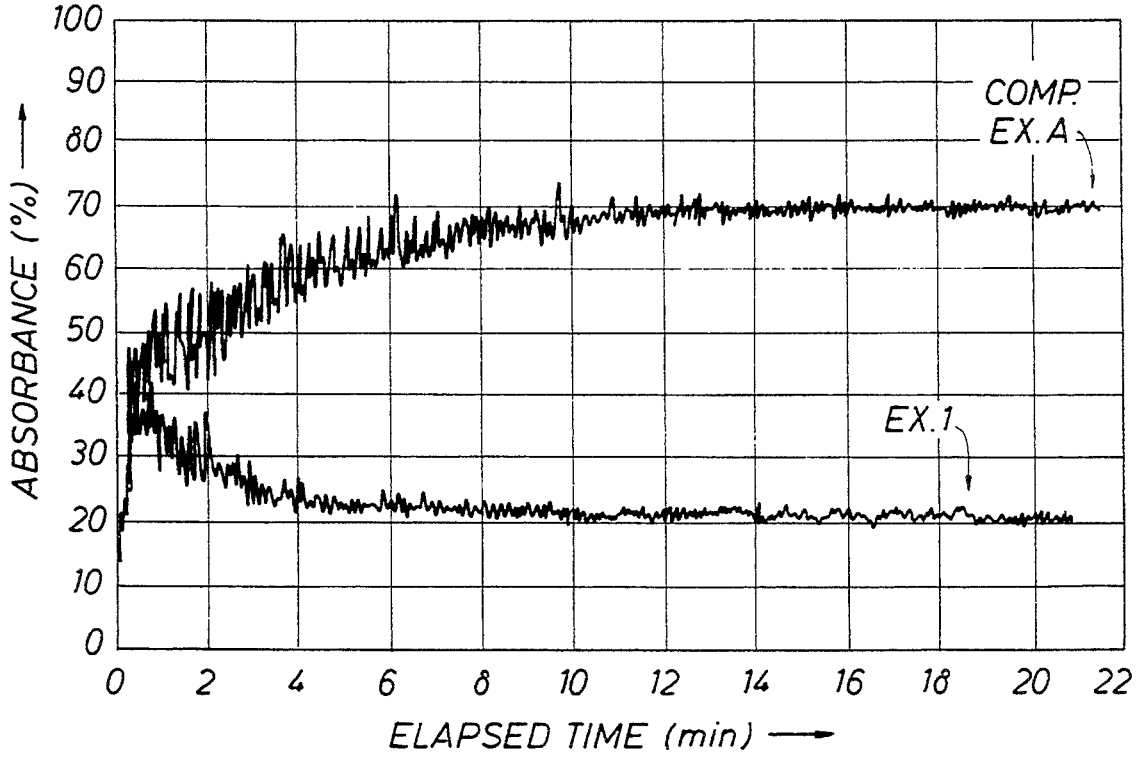
FIG. 1 represents the dissolution (dispersion) rate of a powdered laundry detergent formulation containing a nonionic/secondary alkyl sulfate-containing surfactant composition, and a powdered laundry detergent formulation containing nonionic and primary alcohol sulfate but no secondary alkyl sulfate, at a temperature of 50° F. and no water as detected via the solution turbidity as a function of time.

The nonionic/secondary alkyl sulfate-containing surface active compositions which are suitable for use in the detergent formulations of the present invention are derived from olefins and/or alcohols and are substantially free of unreacted olefin and/or alcohol and substantially free of water. These surface active compositions are prepared by sulfating a detergent range olefin and/or alcohol, neutralizing and saponifying the sulfated detergent range olefin and/or alcohol in the presence of a base dispersed in a nonionic surfactant having a boiling point greater than that of the detergent range olefin and/or alcohol, and passing the neutralized and saponified product through a thin film evaporator to strip unreacted organic matter from the product, thus producing a nonionic surfactant/secondary alkyl sulfate surface active composition which is anhydrous and substantially free of inert diluents. The preparation of these nonionic and secondary alkyl sulfate-containing surface active compositions is described in U.S. Pat. No. 5,075,041, issued Dec. 24, 1991, the teachings of which are incorporated herein by reference.

The nonionic surfactant/secondary alkyl sulfate-containing surfactant compositions suitable for use in the detergent formulations of the present invention contain from about 70 percent by weight to about 95 percent by weight, preferably from about 85 percent by weight to about 95 percent by weight, basis the total weight of the surfactant composition, of a combination of nonionic surfactant and secondary alkyl sulfate. The surfactant compositions typically contain from about 35 percent by weight to about 75 percent by weight, preferably from about 45 percent by weight to about 65 percent by weight, basis the total weight of the surfactant composition, of the secondary alkyl sulfate component, and from about 20 percent by weight to about 80 percent by weight, preferably from about 30 percent by weight to about 45 percent by weight, basis the total weight of the surfactant composition, of the nonionic surfactant component. The surface active compositions also generally contain some residual level of sodium sulfate. The amount of sodium sulfate present in the surface active composition is typically less than about 12 percent by weight, and preferably less than about 9 percent by weight, basis the total weight of the surfactant composition, of sodium sulfate.

These nonionic surfactant/secondary alkyl sulfate-containing surfactant compositions which are substantially anhydrous and substantially free of inert diluents are useful in built or non-built detergents, hard surface cleaners, prespotters, liquid or semi-liquid paste detergent formulations, and powder detergent formulations. The nonionic surfactant/secondary alkyl sulfate-containing surface active compositions are particularly useful in heavy-duty powder, heavy-duty liquid and light-duty liquid detergent formulations and hard surface cleaning formulations. These specific detergent formulations and the advantages which can be obtained when the formulations contain nonionic surfactant-/secondary alkyl sulfate surface active composition such as, for example, water hardness tolerance, rapid powder dissolution, synergism with alcohol ethoxysulfates, and reduced need for hardness ion chelants, will be discussed further below.

The nonionic component of the nonionic/secondary alkyl sulfate-containing surfactant composition suitable for use in the detergent formulations of the present invention is suitably made up of one or more ethylene oxide adducts (i.e., "ethoxylates") of alcohols or alkyl-substituted phenols, and can be represented by the formula $R—O—(CH_2CH_2O)_n—H$, wherein the RO group corresponds to the starting alcohol or alkyl-substituted phenol (less its active hydrogen atom), In general, the suitable alcohol ethoxylates are derived from alcohols, particularly alcohols having a carbon number in the range of from about 8 to about 18, while the suitable alkylphenol ethoxylates are derived from alkylphenols having a carbon number in the range of from about 8 to about 12. Both the alcohol ethoxylates and the phenol ethoxylates are nonionic surfactants well known as components of conventional detergent products.

With regard to the use of alcohol ethoxylate surfactants, the individual compounds are preferably characterized by an alkyl group R having a carbon number in the range of from about 11 to about 15. Both primary and secondary alcohol ethoxylates (having primary or secondary alkyl R groups, respectively) are suitable in the invention. The R group is suitably linear or branched.

The alkyl-substituted phenol ethoxylate surfactants preferably have an alkyl substituent having a carbon number in the range of from about 8 to about 11.

The suitable nonionic ethoxylate surfactants contain an average number of ethylene oxide units (i.e., an average value of n in the above formula) which is in the range of from about 3 to about 14 per molecule. Preferably the ethylene oxide units which is in the range of from about 5 to about 9 per molecule.

The secondary alkyl sulfate component of the nonionic/secondary alkyl sulfate-containing surfactant composition suitable for use in the detergent formulations of the present invention has the formula:

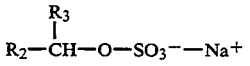

wherein $R_2$ represents an alkyl group having from about 3 to about 18 carbon atoms, and $R_3$ represents an alkyl group having from about 1 to about 6 carbon atoms. In a preferred embodiment, $R_2$ is an alkyl group having from about 10 to about 16 carbon atoms, and $R_3$ is an alkyl group having from about 1 to about 2 carbon atoms. It is preferred that $R_2$ and $R_3$ together are alkyl groups having a total of from about 11 to about 17 carbon atoms. Preferred secondary alkyl sulfate compounds include $C_{12}$ secondary alkyl sulfates (particularly those in which $R_2$ in the above formula represents an alkyl group having 10 carbon atoms and $R_3$ in the above formula represents an alkyl group having 1 carbon atom), $C_{14}$ secondary alkyl sulfates (particularly those in which $R_2$ in the above formula represents an alkyl group having 12 carbon atoms and $R_3$ in the above formula represents an alkyl group having 1 carbon atom) $C_{16}$ secondary alkyl sulfates (particularly those in which $R_2$ in the above formula represents an alkyl group having 14 carbon atoms and $R_3$ in the above formula represents an alkyl group having 1 carbon atom), $C_{18}$ secondary alkyl sulfates (particularly those in which $R_2$ in the above formula represents an alkyl group having 16 carbon atoms and $R_3$ in the above formula represents an alkyl group having 1 carbon atom), and blends of these compounds. The secondary alkyl sulfate component of the surfactant composition in the detergent formulations of the present invention typically comprises a $C_{14}$ secondary alkyl sulfate compound, although blends of one or more $C_{14}$ secondary alkyl sulfate compounds and one or more $C_{18}$ secondary alkyl sulfate compounds, and blends of one or more $C_{14}$ secondary alkyl sulfate compounds, one or more $C_{16}$ secondary alkyl sulfate compounds, and one or more $C_{18}$ secondary alkyl sulfate compounds also provide suitable detergent formulations.

For enhanced biodegradability, it is preferred that the alkyl group R of the alkyl-substituted alkanol ethoxylates, the alkyl substituent of the alkyl-substituted phenols, and the alkyl groups $R_2$ and $R_3$ of the secondary alkyl sulfate molecule all be of predominantly linear carbon chain structure. In this respect, it is particularly preferred that the surfactant molecules be essentially free of alkyl groups having multiple branches in the carbon chain.

In general, in non-built detergent formulations, the nonionic/secondary alkyl sulfate-containing surfactant can be used, per se, as an aqueous solution (e.g., about 5 percent by weight to about 50 percent by weight, basis the total weight of the detergent formulation, of a nonionic/secondary alkyl sulfate-containing surfactant composition) to provide a liquid laundry detergent, or, the nonionic/secondary alkyl sulfate-containing surfactant composition can be mixed with about 2 percent by weight to about 50 percent by weight, basis the total weight of the detergent formulation, of one or more filler compounds, such as for example, sodium sulfate, to provide a powdered laundry detergent.

In general, in built formulations, the nonionic/-secondary alkyl sulfate-containing surfactant composition can be used, for example, with conventional alkaline builders, in an amount of from about 2 percent by weight to about 42 percent by weight, basis the total weight of the formulation, to provide a liquid formulation, and in an amount of from about 25 percent by weight to about 85 percent by weight, basis the total weight of the formulation, of one or more builders to provide a powder formulation.

The built detergent formulations can also suitably contain conventional components such as foamers (e.g., sodium lauryl sulfate, sodium linear alkylbenzene sulfonates, fatty alcohol sulfates, ether sulfates and mixtures thereof); foam stabilizers (e.g., fatty alkanol amides and fatty amine oxides); sequestering agents (e.g., sodium tripolyphosphate and trisodium nitrilotriacetate); corrosion inhibitors or anti-tarnishing agents (e.g., sodium metasilicate); soil suspending agents (e.g., sodium carboxymethylcellulose); inert fillers (e.g., sodium sulfate); bleaches; enzymes; activators; ancillaries; and optical brighteners. Built detergent formulations are especially suitable for heavy-duty laundry detergents.

Powdered Detergent Formulations

The present invention provides a powdered laundry detergent formulation which comprises from about 2 percent by weight to about 50 percent by weight, basis the total weight of the powdered detergent formulation, of a nonionic/secondary alkyl sulfate-containing surfactant composition which contains from about 2 percent by weight to about 56 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and from about 2 percent by weight to about 60 percent by weight, basis the total weight of the surfactant composition, of one or more secondary alkyl sulfate compounds, and from about 25 percent by weight to about 85 percent by weight, basis the total weight of the powdered detergent formulation, of one or more detergent builders. The powdered laundry detergent formulation may also contain from about 1 percent by weight to about 12 percent by weight, basis the total weight of the detergent formulation, of one or more bleach compounds, and from about 2 percent by weight to about 50 percent by weight, basis the total weight of the detergent formulation, of one or more filler compounds. The powdered detergent formulation may also suitably contain minor amounts of other components known in the art for use in powdered laundry detergent formulations. Non-limiting examples of such components include complexing agents, processing aids, fragrances, dyes, brighteners, enzymes, polymers, water, and the like, and mixtures thereof.

The nonionic surfactant/secondary alkyl sulfate-containing surfactant composition in the powdered detergent formulation provides a highly effective detergent performance while retaining the beneficial biodegradability characteristics of nonionic surfactants. The formulation is very effective for removal of both particulate and oily soils from fabrics and for preventing their redeposition onto the fabrics during the laundry wash cycle.

The secondary alkyl sulfate component of the nonionic/secondary alkyl sulfate-containing surfactant composition serves as a multi-functional component in the formulation. Functioning as anionic surfactant, the presence of the secondary alkyl sulfate aids in the removal of particulate and oily soils. The secondary alkyl sulfate component further aids in providing a powdered detergent formulation which is tolerant to hard water wash applications. In addition, the secondary alkyl sulfate component aids in facilitating the suspension of soil in the washwater and its effective separation from laundered fabrics. These several functions of the secondary alkyl sulfate component of the surfactant composition provide a very effective formulation in terms of both its detergent performance and physical properties.

The powdered detergent formulation of the invention comprises from about 2 percent by weight to about 50 percent by weight, basis the total weight of the powdered detergent formulation, of a nonionic/secondary alkyl sulfate-containing surfactant composition comprising between about 2 percent by weight and about 56 percent by weight, basis the total weight of the surfactant composition, of the nonionic surfactant component and from about 2 percent by weight to about 60 percent by weight, basis the total weight of the surfactant composition, of the secondary alkyl sulfate component. Powdered detergent formulations containing a nonionic/secondary alkyl sulfate-containing surfactant composition having from about 2 percent by weight to about 20 percent by weight, basis the total weight of the surfactant composition, of the nonionic surfactant component and from about 5 percent by weight to about 28 percent by weight, basis the total weight of the surfactant composition, of the secondary alkyl sulfate component are preferred, while formulations containing a nonionic/secondary alkyl sulfate-containing surfactant composition having from about 3 percent by weight to about 12 percent by weight, basis the total weight of the surfactant composition, of the nonionic surfactant component, and from about 7 percent by weight to about 18 percent by weight, basis the total weight of the surfactant composition, of the secondary alkyl sulfate component are generally more preferred. Preferably, the nonionic and the secondary alkyl sulfate components of the surfactant composition together comprise between about 8 percent by weight and about 28 percent by weight, basis the total weight of the powdered laundry formulation.

The powdered laundry detergent formulation also contains one or more detergent builder components. Builders are known to be added to powdered detergent formulations to enhance cleaning performance by softening water and providing alkalinity and buffering capacity to the wash. The builder component is preferably one or more materials selected from the group consisting of hydratable alkali metal phosphates, alkali metal carbonates and bicarbonates (mixed or separate, anhydrous or partially hydrated), zeolites (either crystalline or amorphous, and either natural or synthetic), silicates, ethylenediamine tetraacetate, and nitrilotriacetate. Zeolites, carbonates and phosphates are particularly preferred. The detergent builder component is typically present in the powdered detergent formulation in an amount between about 25 percent by weight and about 85 percent by weight, preferably in an amount between about 50 percent by weight and about 75 percent by weight, and most preferably between about 51 percent by weight and about 67 percent by weight, basis the total weight of the formulation.

The powdered laundry detergent formulation may also contain one or more additional surfactant or cosurfactant compounds if desired. The additional surfactant or cosurfactant compound, if present, is selected from the group consisting of nonionic surfactants, anionic surfactants, cationic surfactants, zwitterionic surfactants and mixtures thereof. The additional surfactant or cosurfactant compounds, if present, function as cleaning agents in the powdered detergent formulation. When the powdered laundry detergent composition contains an additional or cosurfactant compound in addition to the nonionic/secondary alkyl sulfate-containing surfactant composition, it is preferred that the additional surfactant be one or more nonionic surfactants such as, for example, a sugar-derived glycol, e.g., alkylpolyglycoside. When an additional or cosurfactant compound is utilized in the powdered detergent composition, it is typically present in an amount of from about 2 percent by weight to about 25 percent by weight, and preferably in the range of from about 2 percent by weight to about 20 percent by weight, basis the total weight of the powdered laundry detergent composition.

The powdered laundry detergent formulation may also, if desired, contain a silicate anticorrosion agent, in an amount between about 2 percent by weight and about 10 percent by weight, basis the total weight of the powdered detergent formulation. Alkali, alkaline earth and ammonium silicate salts are conventionally applied for this service and are very suitable for use in this invention. Sodium silicate is preferred. The silicate components is present in the formulation in a quantity between about 1 percent by weight and about 11 percent by weight, and preferably in a quantity between about 2 percent by weight and about 7 percent by weight, basis the total weight of the formulation.

The balance of the powdered laundry detergent formulation consists essentially of one or more filler compounds. These compounds are typically inert solid powders. The filler compound is selected from the group consisting of sodium chloride, sodium sulfate and mixtures thereof. In a preferred embodiment, the filler compound is sodium sulfate.

In addition to its principal components, nonionic/-secondary alkyl sulfate-containing surfactant, builder, and filler, the powdered laundry detergent formulation may suitably contain minor amounts of other components known in the art for use in laundry powders. Non-limiting examples of such component include dyes, fragrances, bleaches, bleach activators, enzymes, and the like. The amount of each of these components present in the powdered detergent formulation will typically be less than about 12 percent by weight, and preferably less than about 5 percent, basis the total weight of the powdered detergent formulation.

In a preferred embodiment, the powdered laundry detergent formulation also contains one or more bleach compounds. Suitable bleach compounds include sodium perborate, sodium percarbonate, etc., and the like, and mixtures thereof. The bleach compounds may also be used in combination with an activator such as, for example, tetra-acetyl-ethylenediamine (TAED), sodium nonanoyloxybenzene sulfonate (SNOBS), diperoxydodecanedioc acid (DPDDA) and the like, and mixtures thereof. When the powdered detergent formulation contains one or more bleach compounds, the bleach compound generally comprises up to about 12 percent by weight, and preferably from about 4 percent by weight to about 9 percent by weight, basis the total weight of the powdered detergent formulation.

The principal components of the powdered detergent formulation are suitably blended into the finished formulation by conventional methods for the preparation of powdered detergent formulations, for instance, by the spray drying of an aqueous mixture of the builder and the filler to form base beads, followed by blending of the beads with the surfactants and other components; by dry blending or agglomeration techniques; or by any combination of these methods.

In a preferred embodiment, the heavy-duty powdered detergent formulation contains from about 8 percent by weight to about 28 percent by weight, basis the total weight of the detergent formulation, of a nonionic/secondary alkyl sulfate-containing surfactant composition comprising from about 2 percent by weight to about 56 percent by weight, basis the total weight of the surfactant composition, of an alcohol ethoxylate having a carbon number in the range of from about 11 to about 15 and having an average of about 3 to about 12 ethylene oxide units per molecule and from about 2 percent by weight to about 60 percent by weight, basis the total weight of the surfactant composition, of a secondary alkyl sulfate having a carbon number in the range of from about 14 to about 17, from about 25 percent by weight to about 85 percent by weight, basis the total weight of the detergent formulation, of one or more detergent builder compounds, and from about 2 percent by weight to about 50 percent by weight, basis the total weight of the detergent 15 formulation, of one or more filler compounds.

Liquid Laundry Detergent Formulations

The present invention provides heavy-duty liquid laundry detergent formulations which comprise from about 2 percent by weight to about 42 percent by weight, basis the total weight of the liquid laundry detergent formulation, of a surfactant composition comprising from about 2 percent by weight to about 40 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and from about 2 percent by weight to about 59.5 percent by weight, basis the total weight of the surfactant composition, of one or more secondary alkyl sulfate compounds, up to about 15 percent by weight, basis the total weight of the liquid laundry detergent formulation, of one or more additional or cosurfactant compounds, up to about 20 percent by weight, basis the total weight of the liquid laundry detergent formulation, of one or more builder compounds, and from about 35 percent by weight to about 78 percent by weight, basis the total weight of the liquid laundry detergent formulation, of one or more solvents.

The nonionic/secondary alkyl sulfate-containing surfactant composition in the liquid laundry detergent formulation provides a highly effective detergent performance while retaining the beneficial biodegradability characteristics of nonionic surfactants. The liquid laundry detergent formulation is very effective for removal of both particulate and oily soils from fabrics and for preventing their redeposition onto the fabrics during the laundry wash cycle.

The laundry liquid detergent formulation contains, as essential components, a surfactant composition comprising a nonionic component and a secondary alkyl sulfate anionic component, one or more additional or cosurfactant compounds, and one or more solvents. The liquid laundry detergent formulations provide improved water hardness tolerance, biodegradability and color when compared to heavy-duty liquid laundry detergents containing linear alkylbenzene sulfonate or primary alkyl sulfate as anionic surfactant components.

The liquid laundry detergent formulation comprises from about 2 percent by weight to about 42 percent by weight, basis the total weight of the liquid laundry detergent formulation, of a nonionic/secondary alkyl sulfate-containing surfactant composition comprising between about 2 percent by weight and about 40 percent by weight, basis the total weight of the surfactant composition, of one or more nonionic surfactant components and from about 2 to about 59.5 percent by weight, basis the total weight of the surfactant composition, of one or more secondary alkyl sulfate components. Formulations containing a nonionic/secondary alkyl sulfate-containing surfactant composition having between about 4 percent by weight and about 30 percent by weight, basis the total weight of the surfactant composition, of the nonionic surfactant component and between about 6 to about 30 percent by weight, basis the total weight of the surfactant composition, of the secondary alkyl sulfate component are preferred, while formulations containing between about 4 percent by weight and about 12 percent by weight of the nonionic surfactant component and between about 9 percent by weight to about 15 percent by weight of the secondary alkyl sulfate component are generally more preferred. Preferably, the nonionic and secondary alkyl sulfate components of the surfactant composition together comprise between about 5 percent by weight and about 90 percent by weight of the total weight of the surfactant composition.

The liquid laundry detergent formulation also contains one or more additional surfactant or cosurfactant compounds. The additional surfactant or cosurfactant compound is selected from the group consisting of nonionic surfactant, anionic surfactants, cationic surfactants, zwitterionic surfactants and mixtures thereof. The additional surfactant or cosurfactant compounds function as cleaning agents in the liquid laundry detergent formulation. It is preferred that the additional surfactant be one or more nonionic surfactants such as, for example, a sugar-derived glycol, e.g., alkylpolyglycoside. The additional surfactant or cosurfactant compound is utilized in the liquid laundry detergent composition in an amount of from about 2 percent by weight to about 25 percent by weight, and preferably in the range of from about 2 percent by weight to about 20 percent by weight, basis the total weight of the liquid laundry detergent composition.

In addition to the nonionic/secondary alkyl sulfate-containing surfactant composition component and the additional surfactant or cosurfactant compound component, the only necessary component of the laundry liquid composition of the present invention is one or more solvents to aid in the blending of the surfactants and builder components, if present. The solvent may be water or any other known solvent which aids in the blending of surfactants. Solvents other than water which are suitable include the lower alcohols such as, for example, ethanol, isopropanol, butanol, etc., the alkali metal aryl sulfonates such as, for example, sodium xylenesulfonate, sodium cumenesulfonate, sodium toluenesulfonate, etc., the polyols such as, for example, propylene glycol, hexylene glycol, etc., and the like and mixtures thereof. The solvent(s) is typically present in the laundry liquid detergent formulation in an amount in the range of from about 35 percent by weight to about 78 percent by weight, basis the total weight of the formulation.

When a lower alcohol is used as a solvent, it is typically used in combination with at least one other solvent such as water, polyols, etc. The amount of lower alcohol utilized in the laundry liquid composition is generally an amount in the range of from about 0.1 percent by weight to about 7 percent by weight, basis the total weight of the composition.

Any polyol containing from about 2 to about 6 carbon atoms and from 2 to about 6 hydroxy groups can be used as a solvent in the laundry liquid compositions of the present invention. Examples of such polyols are ethylene glycol, propylene glycol, hexylene glycol and glycerine. Propylene glycol is particularly preferred. When a polyol is used as a solvent, the polyol typically is used in combination with at least one other solvent and represents from about 0.1 percent by weight to about 8 percent by weight, basis the total weight of the detergent composition.

In a preferred embodiment, the solvent is water or a water-containing solvent system. The laundry liquids generally contain from about 35 percent by weight to about 78 percent by weight, preferably from about 40 percent by weight to about 65 percent by weight, basis the total weight of the liquid laundry detergent formulation, of water. A particularly suitable water-containing solvent system contains water, ethanol and one or more polyols.

The liquid laundry detergent formulation can also, if desired, contain one or more detergent builder components. Builders are included in detergent formulations to enhance their cleaning performance by softening water and providing alkalinity and buffering capacity to the wash. The builder component can be an organic compound which is soluble in the formulation. The builder may be present in an amount up to about 20 percent by weight of the liquid laundry detergent formulation. When such a builder is used, it is preferably present in the formulation in an amount between about 5 and about 15 percent by weight.

The builder component is preferably one or more materials selected from the group consisting of hydratable alkali metal phosphates, alkali metal carbonates and bicarbonates (mixed or separate, anhydrous or partially hydrated), zeolites (either crystalline or amorphous, and either natural or synthetic), polycarboxylates, silicates, ethylenediamine tetraacetate, nitrilotriacetate, and mixtures thereof. Carbonate and polycarboxylate builders are particularly preferred. Examples of water-soluble inorganic builders which can be used, alone or in admixture with themselves and organic alkaline builder salts, are alkali metal carbonates, phosphates, polyphosphates, and silicates. Specific examples of such salts are sodium tripolyphosphate, sodium carbonate, potassium carbonate, trisodium phosphate, tetrasodium pyrophosphate, tetrapotassium pyrophosphate, potassium tripolyphosphate, and sodium hexametaphosphate. Examples of organic builder salts which can be used alone, or in admixture with each other or with the preceding inorganic alkaline builder salts are alkali metal polycarboxylates, e.g., water-soluble citrates such as sodium and potassium citrate, sodium and potassium tartrate, the sodium and potassium salts of tartaric acid monosuccinate, the sodium and potassium salts of tartaric acid disuccinate, sodium and potassium ethylenediamine-tetraacetate, sodium and potassium N-(2-hydroxyethyl)-ethylene diamine triacetates, sodium and potassium nitrilo triacetates and sodium and potassium N-(2-hydroxyethyl)-nitrilo diacetates. Other organic detergency builders such as water-soluble phosphonates can find use in the compositions of the invention. When the liquid laundry detergent contains a builder component, the builder is generally present in an amount up to about 20 percent by weight, preferably in an amount between about 5 percent by weight and about 15 percent by weight, and most preferably between about 6 percent by weight and about 12 percent by weight, basis the total weight of the liquid laundry detergent formulation.

The liquid laundry detergent composition may also contain an alkanolamine component selected from the group consisting of an monoethanolamine, diethanolamine, triethanolamine and mixtures thereof. Low levels of the alkanolamines, particularly monoethanolamine, are preferred to enhance product stability, and detergency performance. While the present compositions can contain mixtures of the alkanolamines, best color stability is obtained using single alkanolamines. When the liquid laundry detergent contains an alkanolamine component, such component is typically present in the composition in an amount in the range of up to about 7 percent by weight, and preferably in an amount in the range of from about 1 percent by weight to about 4 percent by weight, basis the total weight of the liquid laundry detergent formulation.

The only other necessary component of the liquid laundry detergent composition of the present invention is one or more solvents to aid in the blending of the surfactants and builder components, if present. The solvent may be water or any other known solvent which aids in the blending of surfactants. Solvents other than water which are suitable include the lower alcohols such as, for example, ethanol, isopropanol, butanol, etc., the alkali metal aryl sulfonates such as, for example, sodium xylenesulfonate, sodium cumenesulfonate, sodium toluenesulfonate, etc., the polyols such as, for example, propylene glycol, hexylene glycol, etc., and the like and mixtures thereof. The solvent(s) is typically present in the liquid laundry detergent formulation in an amount in the range of from about 35 percent by weight to about 80 percent by weight, basis the total weight of the liquid laundry detergent formulation.

When a lower alcohol is used as a solvent, it is typically used in combination with at least one other solvent such as water, polyols, etc. The amount of lower alcohol utilized in the liquid laundry detergent formulation is generally an amount in the range of from about 0.1 percent by weight to about 7 percent by weight, basis the total weight of the liquid laundry detergent formulation.

Any polyol containing from about 2 to about 6 carbon atoms and from 2 to about 6 hydroxy groups can be used as a solvent in the liquid laundry detergent formulations of the present invention. Examples of such polyols are ethylene glycol, propylene glycol, hexylene glycol and glycerine. Propylene glycol is particularly preferred. When a polyol is used as a solvent, the polyol typically is used in combination with at least one other solvent and represents from about 0.1 percent by weight to about 8 percent by weight, basis the total weight of the liquid laundry detergent formulation.

In a preferred embodiment, the solvent is water or a water-containing solvent system. The laundry liquids generally contain from about 35 percent by weight to about 78 percent by weight, preferably from about 40 percent by weight to about 65 percent by weight, basis the total weight of the composition, of water. A particularly suitable water-containing solvent system contains water, ethanol and one or more polyols.

The liquid laundry detergent formulation also preferably contains from about 0.1 percent by weight to about 5 percent by weight, preferably from about 1 percent by weight to about 2 percent by weight, basis the total weight of the laundry liquid, of one or more enzymes. Suitable enzymes include proteases, amylases, lipases, cellulases, and the like, with proteases being preferred.

The liquid laundry detergent formulation can also contain from about 0.5 percent by weight to about 5 percent by weight, preferably from about 0.5 percent by weight to about 2 percent by weight, basis the total weight of the liquid laundry detergent formulation, of one or more enzyme stabilizers. Suitable enzyme stabilizers include calcium ions, sodium formate, borate, propylene glycol, glycerine, betaines, and the like. The level of enzyme stabilizer should be selected so that there is always some minimum level available for the enzyme, after allowing for complexation with builders, etc., in the composition. In a preferred embodiment, the enzyme stabilizer is a calcium ion. Any water-soluble calcium salt can be used as the source of calcium ion, including calcium chloride, calcium formate, and calcium acetate.

The liquid laundry detergent formulation can also contain additional components such as soil removal agents, antiredeposition agents, suds regulators, hydrotropes, opacifiers, antioxidants, bacteriocides, dyes, perfumes, and brighteners which are known in the art. Such optional components generally comprise from about 1 percent by weight to about 20 percent by weight, preferably from about 6 percent by weight to about 15 percent by weight of the total laundry liquid detergent formulation.

The principal components of the liquid laundry detergent formulation are suitable blended into the finished formulation by conventional methods such as, for example, by direct mixing/blending. In a preferred embodiment, the liquid laundry detergent formulation from about 2 percent by weight to about 42 percent by weight, basis the total weight of the detergent formulation, of a surfactant composition comprising from about 2 percent by weight to about 40 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and from about 2 percent by weight to about 59.5 percent by weight, basis the total weight of the surfactant composition, of one or more secondary alkyl sulfate compounds, up to about 15 percent by weight, basis the total weight of the liquid laundry detergent formulation, of one or more additional or cosurfactant compounds, and from about 35 percent by weight to about 78 percent by weight, basis the total weight of the liquid laundry detergent formulation, of one or more solvents.

Light-Duty Liquid Detergent Formulations

The present invention provides light-duty liquid detergent formulations which comprise from about 1 percent by weight to about 35 percent by weight, basis the total weight of the light-duty liquid detergent formulation, of a nonionic/secondary alkyl sulfate-containing surfactant composition comprising from about 1 percent by weight to about 43 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and from about 1 percent by weight to about 51 percent by weight, basis the total weight of the surfactant composition, of one or more secondary alkyl sulfate compounds, from about 1 percent by weight to about 15 percent by weight, basis the total weight of the light-duty liquid detergent formulation, of one or more suds stabilizers, and from about 50 percent by weight to about 98 percent by weight, basis the total weight of the light-duty liquid detergent formulation, of water.

The nonionic/secondary alkyl sulfate-containing surfactant composition in the light-duty liquid formulation provides a highly effective detergent performance while retaining the beneficial biodegradability characteristics of nonionic surfactants. The light duty liquid detergent formulation is very effective for removal of grease and food soils.

The light-duty liquid detergents of the present invention contain, as essential components, a surfactant composition comprising a nonionic component and a secondary alkyl sulfate anionic component, one or more suds stabilizing compounds, and water. The light-duty liquid detergent formulations provide improved grease removal and biodegradability when compared to light-duty liquids containing linear alkylbenzene sulfonate or primary alkyl sulfate as anionic surfactant components.

The light-duty liquid or dishwashing detergent formulation comprises between about 1 percent by weight and about 35 percent by weight, basis the total weight of the light-duty liquid detergent formulation, of a nonionic/secondary alkyl sulfate-containing surfactant composition which contains between about 1 percent by weight and about 43 percent by weight of one or more nonionic surfactant components and from about 1 to about 51 percent by weight of one or more secondary alkyl sulfate component. Formulations containing a nonionic/secondary alkyl sulfate-containing surfactant composition having between about 2 percent by weight and about 12 percent by weight, basis the total weight of the surfactant composition, of the nonionic surfactant component and between about 2 to about 15 percent by weight, basis the total weight of the surfactant composition, of the secondary alkyl sulfate component are preferred, while formulations containing between about 6 percent by weight and about 11 percent by weight, basis the total weight of the surfactant composition, of the nonionic surfactant component and between about 2 percent by weight to about 12 percent by weight, basis the total weight of the surfactant composition, of the secondary alkyl sulfate component are generally more preferred. Preferably, the nonionic and the secondary alkyl sulfate components of the surfactant composition together comprise between about 3 percent by weight and about 25 percent by weight of the light-duty liquid formulation.

In addition to the secondary alkyl sulfate anionic component of the surfactant composition, the light-duty liquid detergent formulation may also contain one or more additional anionic surfactants, if desired. Suitable additional anionic surfactants include alkenyl carboxysulfonates, methylester sulfonates, alcohol ethoxysulfates, linear alkylbenzene sulfonates, alpha olefin sulfonates, and the like. While any of these anionic surfactants can be utilized in the light-duty liquid, it is preferred that if an anionic surfactant is used in addition to secondary alkyl sulfate in the light duty liquid formulation, the additional anionic surfactant is an alcohol ethoxysulfate characterized by the chemical formula:

$$R'—O—(CH_2CH_2O)_x—SO_3M$$

wherein R′ is a straight chain or branched alkyl group having in the range of from about 8 to about 18 carbon atoms, preferably from about 12 to about 18 carbon atoms, or an alkylaryl group having an alkyl moiety having from about 8 to about 12 carbon atoms, x represents the average number of oxyethylene groups per molecule and is in the range of from about 1 to about 12, preferably from about 2 to about 12, and M is a cation selected from an alkali metal, an ammonium ion, and mixtures thereof. R′ is preferably substantially straight chain alkyl, that is, at least about 50 percent, preferably about 85 percent, of the alkyl R′ groups in the alcohol ethoxysulfate are straight chain. It is understood that R′ can be substituted with any substituent which is inert such as, for, example, halo groups.

Examples of suitable alcohol ethoxysulfates which can be used in the composition of the present invention include the sulfated ethoxylated fatty alcohols, preferably linear primary and secondary alcohols with about $C_8$ to about $C_{18}$ alkyl groups, preferably about $C_{12}$ to about $C_{15}$ alkyl groups, and an average of about 1 to about 12, preferably about 5 to about 12 moles of ethylene oxide per mole of alcohol, and sulfated ethoxylated alkylphenols with about $C_8$ to about $C_{12}$ alkyl groups, preferably about $C_8$ to about $C_{10}$ alkyl groups, and an average of about 1 to about 12 moles of ethylene oxide per mole of alkylphenol. The preferred class of alcohol ethoxysulfates are the sulfated linear alcohols, such as the sulfated $C_{12}$ to about $C_{15}$ alcohols which have been ethoxylated with an average of about 2 to about 12 moles of ethylene oxide. A most preferred alcohol ethoxysulfate for highly effective detergent performance is prepared by sulfating a $C_{12}$–$C_{15}$ alcohol ethoxylate with an average of 3.0 moles of ethylene oxide. A most preferred alcohol ethoxysulfate for a particularly mild light duty liquid composition is prepared by sulfating a $C_{12}$–$C_{13}$ alcohol ethoxylate with an average of 6.5 moles of ethylene oxide.

When the light-duty liquid detergent formulation of the invention contains an alcohol ethoxysulfate as an additional anionic component, the alcohol ethoxysulfate component generally comprises in the range of from about 1 percent by weight to about 20 percent by weight of the alcohol ethoxysulfate, basis the total weight of the light duty liquid formulation. Light-duty liquid formulations containing in the range of from about 2 percent by weight to about 17 percent by weight alcohol ethoxysulfate are preferred, while formulations containing from about 2 percent by weight to about 15 percent by weight of alcohol ethoxysulfate component are generally more preferred. In a preferred embodiment, the light-duty liquid detergent formulation will contain from about 3 percent by weight to about 15 percent by weight of an alcohol ethoxysulfate component.

In one embodiment, the light-duty liquid detergent formulation can also contain a water-soluble zwitterionic surfactant. A suitable zwitterionic surfactant is a water-soluble betaine, particularly alkyldimethyl betaines and amidobetaines. Typical alkyldimethyl betaines include decyl dimethyl betaine or 2-(N-decyl-N, N-dimethylammonio) acetate, coco dimethyl betaine or 2-(N-coco-N, N-dimethylammonio) acetate, myristyl dimethyl betaine, palmityl dimethyl betaine, lauryl dimethyl betaine, cetyl dimethyl betaine, stearyl dimethyl betaine, and the like. The amidobetaines similarly include cocoamidoethyl betaine, cocoamidopropyl betaine and the like. A preferred betaine is coco ($C_8$–$C_{18}$) amidopropyl dimethyl betaine. When the light-duty liquid detergent formulation contains a zwitterionic surfactant, it typically contains from about 0.1 percent by weight to about 8 percent by weight, preferably from about 0.1 percent by weight to about 4 percent by weight, and most preferably, from about 0.1 percent by weight to about 1.0 percent by weight. The use of a zwitterionic surfactant in the light-duty liquid provides advantages in formulatability, clarity and mildness.

In addition to the nonionic/secondary alkyl sulfate-containing surfactant composition, the light-duty liquid detergent formulation contains one or more foam boosters or suds stabilizers. As used herein, the terms "suds stabilizers" and "foam boosters" are used interchangeably. Suitable suds stabilizers include betaines, ethylene oxide condensates, fatty acid amides, amine oxide semipolar nonionics and cationic surfactants. Examples of preferred betaines include dodecyl dimethyl betaine, cetyl dimethyl betaine, dodecyl amidopropyldimethyl betaine, tetradecyldimethyl betaine, tetradecylamidopropyldimethyl betaine, and dodecyldimethylammonium hexanoate. The suds stabilizer generally comprises from about 0.1 percent by weight to about 8 percent by weight, preferably from about 0.1 percent by weight to about 4 percent by weight, basis the total weight of the light-duty liquid detergent formulation.

The balance of the light-duty liquid detergent formulation will be an aqueous medium comprising water and up to about 8 percent by weight, preferably from about 2 percent by weight to about 5 percent by weight, basis the total weight of the light-duty liquid formulation, of a solubilizer. Suitable solubilizers include $C_2$–$C_3$ monohydric and polyhydric alcohols, water-soluble $C_1$–$C_3$ alkyl substituted benzene sulfonates, urea and the like, and mixtures thereof. Suitable monohydric alcohols include ethanol and isopropanol, with ethanol being preferred; and suitable polyhydric alcohols include propylene glycol and glycerol. Suitable $C_1$–$C_3$ alkylbenzene sulfonates are the sodium, potassium and ammonium salts, e.g., sodium xylenesulfonate, potassium toluene sulfonate and sodium isopropylbenzene sulfonate or sodium cumene sulfonate. Typically, the solubilizer is selected to provide clarity, to provide a low-temperature clear point, and/or to control viscosity. Since the alcohol and sulfonate solubilizers do not exhibit the same effects, the liquid-duty liquid may contain a mixture of alcohol and hydrotropic sulfonate solubilizers in order to obtain the benefits of both. Excessive use of solubilizers, i.e. greater than about 10 percent by weight, in dishwashing liquids may act as suds depressants.

The proportion of water in the light-duty liquid detergent formulation will generally be in the range of from about 50 percent by weight to about 98 percent by weight, preferably from about 55 percent by weight to about 95 percent by weight, basis the total weight of the light-duty liquid detergent formulation.

The described light-duty liquid detergent formulations are essentially unbuilt liquids, i.e., they do not contain proportions of organic or inorganic builder salt in the detergent building proportions, and, therefore, are particularly suitable for use as liquid, hand dishwashing detergents. Thus, the light-duty liquids can contain any of the usual adjuvants found in those formulations provided that they do not interfere with the performance properties of the present light-duty liquids. Such additional components include minor amounts of perfumes and colors for aesthetic purposes, opacifiers such as ethylene glycol distearate or polystyrene, thickening agents such as natural gums, hydroxypropyl methyl cellulose, or polyacrylates, sequestering agents such as citrate or ethylene diamine tetraacetate, preservatives such as formaldehyde or monomethyloldimethyl hydantoin, and inert salts such as sodium sulfate. The total concentration of added ingredients typically will be less than about 5 percent by weight, preferably less than about 3 percent by weight of the light-duty liquid.

In a preferred embodiment, the light-duty liquid detergent formulation comprises from about 1 percent by weight to about 35 percent by weight, basis the total weight of the light-duty liquid detergent formulation, of a nonionic/secondary alkyl sulfate-containing surfactant composition which contains from about 1 percent by weight to about 43 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and from about 1 percent by weight to about 51 percent by weight, basis the total weight of the surfactant composition, of one or more secondary alkyl sulfate compounds, from about 1 percent by weight to about 15 percent by weight, basis the total weight of the light-duty liquid detergent formulation, of one or more suds stabilizers, and from about 50 percent by weight to about 98 percent by weight, basis the total weight of the light-duty liquid detergent formulation, of water.

The light-duty liquid detergent formulations may be prepared by conventional processing techniques. A typical procedure would be a direct blending/mixing technique.

Hard Surface Cleaning Formulations

The present invention provides hard surface cleaning formulations which comprise from about 0.1 percent by weight to about 40 percent by weight, basis the total weight of the hard surface cleaning composition, of a nonionic/secondary alkyl sulfate-containing surfactant composition which comprises from about 0.1 percent by weight to about 37.5 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and from about 0.1 percent by weight to about 52.5 percent by weight, basis the total weight of the surfactant composition, of one or more secondary alkyl sulfate compounds.

The nonionic/secondary alkyl sulfate-containing surfactant in the hard surface cleaning formulation provides a highly effective detergent performance while retaining the beneficial biodegradability characteristics of nonionic surfactants. The hard surface cleaning formulation is very effective for removal of grease and oily/particulate soils.

A liquid hard surface cleaning formulations of the present invention contain, as essential components, a surfactant composition containing a nonionic component and a secondary alkyl sulfate anionic component, one or more solvents. The formulations provide improved biodegradability and color characteristics when compared to hard surface cleaning formulations containing linear alkylbenzene sulfonate as the anionic surfactant component.

The hard surface cleaning formulations comprise between about 1 percent by weight and about 42 percent by weight of a nonionic/secondary alkyl sulfate-containing surfactant comprising between about 0.1 percent by weight and about 37.5 percent by weight, basis the total weight of the surfactant composition, of one or more nonionic surfactant components, and from about 0.1 to about 52.5 percent by weight, basis the total weight of the surfactant composition, of one or more secondary alkyl sulfate components. Hard surface cleaning formulations containing between about 0.3 percent by weight and about 10 percent by weight of the nonionic surfactant component and between about 0.3 to about 12 percent by weight of the secondary alkyl sulfate component, basis the total weight of the surfactant composition, are preferred, while formulations containing between about 0.3 percent by weight and about 5 percent by weight of the nonionic surfactant component and between about 1 percent by weight to about 7 percent by weight of the secondary alkyl sulfate component, basis the total weight of the surfactant composition, are generally more preferred. Preferably, the nonionic surfactant component and the secondary alkyl sulfate component together comprise between about 0.5 percent by weight and about 25 percent by weight of the hard surface cleaning formulation.

Liquid hard surface cleaning formulations also contain one or more solvents to aid in the soil removal and blending of the surfactants and builder components, if present. Solvents are known to be added to liquid hard surface cleaning compositions to stabilize, couple ingredients, and enhance performance. The solvent may be water or any other known solvent which aids in the blending of surfactants. Solvents other than water which are suitable include the lower alcohols such as, for example, ethanol, isopropanol, butanol, etc., the alkali metal aryl sulfonates such as, for example, sodium xylenesulfonate, sodium cumenesulfonate, sodium toluenesulfonate, etc., the polyols such as, for example, propylene glycol, hexylene glycol, etc., the glycol ethers such as, for example, propylene glycol n-butylether and monopropylene glycol monomethylether, etc., ethylene glycol monobutylether, diethylene glycol monobutylether, and the like and mixtures thereof. Pine oils, turpenes and other hydrocarbons may also be utilized in the form of microemulsions. The solvent(s) is typically present in the hard surface cleaning composition in an amount in the range of from about 60 percent by weight to about 98 percent by weight, basis the total weight of the hard surface cleaning formulation.

In a preferred embodiment, the solvent is water or a water-containing solvent system. The liquid hard surface cleaning formulations generally contain from about 60 percent by weight to about 98 percent by weight, preferably from about 75 percent by weight to about 98 percent by weight, basis the total weight of the hard surface cleaning formulation, of water. A particularly suitable water-containing solvent system contains water, ethanol and one or more polyols.

The hard surface cleaning formulation may contain one or more additional or cosurfactant compounds if desired. The additional surfactant or cosurfactant compound, if present, is selected from the group consisting of nonionic surfactant, anionic surfactants, cationic surfactants, zwitterionic surfactants and mixtures thereof. The additional or cosurfactant compounds, if present, function as cleaning agents in the hard surface cleaning formulation. When the hard surface cleaning formulation contains an additional or cosurfactant compound in addition to the nonionic/secondary alkyl sulfate-containing surfactant composition, it is preferred that the additional surfactant be one or more nonionic surfactants such as, for example, a sugar-derived glycol, e.g., alkylpolyglycoside. When an additional or cosurfactant compound is utilized in the hard surface cleaning formulation, it is typically present in an amount of from about 2 percent by weight to about 25 percent by weight, and preferably in the range of from about 2 percent by weight to about 20 percent by weight, basis the total weight of the hard surface cleaning formulation.

The hard surface cleaning formulations can also, if desired, contain one or more builder components. The builder component can either be of the inorganic or organic type. The builder component is preferably one or more materials selected from the group consisting of hydratable alkali metal phosphates, alkali metal carbonates and bicarbonates (mixed or separate, anhydrous or partially hydrated), zeolites (either crystalline or amorphous, and either natural or synthetic), silicates, ethylenediamine tetraacetate, nitrilotriacetate, and mixtures thereof. Carbonates and complexing agents such as, for example, ethylenediaminetetraacetate, are particularly preferred builders. Examples of water-soluble inorganic builders which can be used, alone or in admixture with themselves and organic alkaline builder salts, are alkali metal carbonates, phosphates, polyphosphates, and silicates. Specific examples of such salts are sodium tripolyphosphate, sodium carbonate, potassium carbonate, trisodium phosphate, tetrasodium pyrophosphate, tetrapotassium pyrophosphate, potassium tripolyphosphate, and sodium hexametaphosphate. Examples of organic builder salts which can be used alone, or in admixture with each other or with the preceding inorganic alkaline builder salts are alkali metal polycarboxylates, e.g., water-soluble citrates such as sodium and potassium citrate, sodium and potassium tartrate, the sodium and potassium salts of tartaric acid monosuccinate, the sodium and potassium salts of tartaric acid disuccinate, sodium and potassium ethylenediaminetetraacetate, sodium and potassium N-(2-hydroxyethyl)-ethylene diamine triacetates, sodium and potassium nitrilo triacetates and sodium and potassium N-(2-hydroxyethyl)-nitrilo diacetates. Other organic detergency builders such as water-soluble phosphonates can also find use in hard surface cleaning formulations. The builder, if present, is typically present in an amount between about 0.1 percent by weight and about 19 percent by weight, basis the total weight of a liquid hard surface cleaning formulation, or between about 25 percent by weight and about 95 percent by weight, basis the total weight of a powdered hard surface cleaning composition.

The liquid hard surface cleaning formulations may additionally contain one or more coupling agents, if desired. The coupling agent serves as a stabilizer for the hard surface cleaning formulation. Suitable coupling agents include lower alcohols, alkyl metal arylsulfonates, polyols, glycol ethers, phosphate esters and mixtures thereof, with lower alcohols and alkyl metal arylsulfonates being preferred. The coupling agent, if present, is typically present in an amount between about 0.5 percent by weight and about 15 percent by weight, basis the total weight of the hard surface cleaning formulation.

In addition to the nonionic/secondary alkyl sulfate-containing surfactant composition and one or more solvents, the hard surface detergent formulation of the present invention typically contains other substances generally present in detergent compositions. For example, the liquid composition may be thickened if desired by the addition of known viscosity increasing agents. Foam stabilizing agents such as, for examples, betaines, ethylene oxide condensates, fatty acid amides, amine oxide semi-polar nonionics and cationic surfactants. Examples of preferred betaines include dodecyl dimethyl betaine, cetyl dimethyl betaine, dodecyl amidopropyldimethyl betaine, tetradecyldimethyl betaine, tetradecylamidopropyldimethyl betaine, and dodecyldimethylammonium hexanoate may also be incorporated. Other ingredients which may also be present include preservatives, humectants, foam boosters, antifoaming agents, dispersants, pH modifiers, buffers, colorants, perfumes, and the like. Such optional components generally comprise from about 0.1 percent by weight to about 12 percent by weight, preferably from about 0.2 percent by weight to about 6 percent by weight of the hard surface cleaning formulation. The powdered formulations may also contain inert fillers, e.g., sodium sulfate, to balance the formulation.

The hard surface cleaner formulations may be prepared by conventional processing techniques. A typical procedure would be a direct blending/mixing technique for a liquid formulation, and dry blending or agglomeration for a powdered formulation.

The ranges and limitations provided in the instant specification and claims are those which are believed to particularly point out and distinctly claim the present invention. It is, however, understood that other ranges and limitations which perform substantially the same function in substantially the same manner to obtain the same or substantially the same result are intended to be within the scope of the present invention as defined by the present invention and claims.

The invention is further described with reference to the following examples, which are intended to illustrate certain particularly preferred aspects of the invention, without limiting its broader scope.

Illustrative Embodiments

Preparation of Surfactant Composition

Sulfation

To a round-bottomed flask equipped with a paddle stirrer, thermometer, and addition funnel topped with a nitrogen blanket was added 64.21 grams of internal pentadecene and 64.22 grams of internal hexadecene. After cooling to 20°–21° C. 64.20 grams of 95% sulfuric acid was added at such a rate that the temperature was maintained at 20°–21° C. When acid addition was complete, 4.50 grams of distilled water was stirred for one hour and then phase separated. The upper phase contained 153.22 grams and the lower phase contained 34.54 grams.

Neutralization/Saponification

The upper phase from the sulfation above (153.22 grams) was added to a small stirred mixture of 32 grams of Neodol 23-6.5 alcohol ethoxylate (NEODOL is a trademark of Shell Chemical Company) and 29.31 grams of 50% sodium hydroxide, at 38°–39° C. over a period of forty-nine minutes. The pH was monitored and was 14 near the end of neutralization.

After neutralization, the mixture was heated with stirring to reflux (approximately 108° C.) and held at reflux for one hour.

A sample after thirty minutes at reflux gave an anionic concentration of 124.62 meq/100 grams. After one hour, the anionic concentration was 125.12 meq/100 grams. The alkalinity after one hour was 0.066 meq/gram or about 5.3% weight, basis anionic. Accordingly, 2.29 grams of 50% sodium hydroxide was added to increase the reserve alkalinity.

Thin Film Evaporation

To a wiped film evaporator at 145°–146° C. and 119–130 mm Hg pressure, was added 200.89 grams of the neutralized/saponified product from the above step. The wiped film evaporator distillation required thirty-six minutes and produced 158.86 grams of bottoms product, 9.06 grams of organic and 27.29 grams of water in the distillate. The organic comprised 58 percent by weight $C_{15}$ internal olefin, 35.5 percent by weight $C_{16}$ internal olefin and 6.5 percent by weight $C_{15/16}$ alcohol. The bottom product contained an anionic concentration of 146.1 meq/100 grams.

147.11 Grams of the bottoms produced above in the first wiped film evaporator distillation was added to a wiped film evaporator at 145°–146° C. and 0.12–0.19 mm Hg pressure over a period of about twenty minutes. 103.71 Grams of product, 18.81 grams of organic tops and 1.5 grams of water were produced. The product contained an anionic concentration of 186.93 meq/100 grams.

The composition prepared in the above example contains about 63 percent by weight secondary alkyl sulfate, about 4.8 percent by weight sodium sulfate, and about 32.2 percent by weight alcohol ethoxylate.

Preparation of Detergent Formulations

Heavy-Duty Powdered Detergent Formulations

Example 1

22.9 Grams of a product (96% active) consisting of $C_{12-13}$ alcohol ethoxylate having an average of 6.5 ethylene oxide units per molecule (AE) and $C_{14-17}$ secondary alkyl sulfate (SAS, sodium salt) in a 1:1 ratio of SAS to AE, were warmed to 120° F. and added at a rate of 2.2 cc/min. to 125 grams of sodium carbonate (light density) and blended at 100 revolutions per minute (rpm) using a Brabender dry mixer and allowed to mix well. The resulting material was a flowable powder. The properties of the composition prepared are presented in Table I and FIG. 1.

Comparative Example A 11.0 Grams of $C_{12-13}$ alcohol ethoxylate having an average of 6.5 ethylene oxide units per molecule were warmed to 120° F. and added at a rate of 2.2 cc/min. to 125 grams of sodium carbonate (light density) and blended at 100 revolutions per 20 minute (rpm) using a Brabender dry mixer and allowed to mix well. 40 Grams of $C_{14-15}$ primary alcohol sulfate (sodium salt, 25% active) were then added to the alcohol ethoxylate/sodium carbonate mixture and allowed to mix well. The resulting material was a sticky powder. The properties of the composition prepared are presented in Table I and FIG. 1.

Built Heavy-Duty Liquid Detergent Formulation

Example 2

57 Grams of water were added to the mixing vessel and warmed to 90° F. 2 Grams of ethanol, 2 grams of monoethanolamine 5 and 4 grams of propylene glycol were then added. 25 Grams of a product (96% active) consisting of $C_{12-13}$ alcohol ethoxylate having an average of 6.5 ethylene oxide units per molecule (AE) and secondary alkyl sulfate (SAS, sodium salt) in a 2:1 ratio of SAS to AE, was thereafter added and the mixture was allowed to stir. The temperature was then raised to 110°–120° F. Following the temperature increase, 2 grams of coconut fatty acid, 5 grams of citric acid and 4 grams of sodium hydroxide (50% solution) were added to the mixture. The resulting material was a clear stable liquid. The properties of the composition prepared are presented in Table I and FIG. 2.

Comparative Example B 46.3 Grams of water were added to the mixing vessel and warmed to 90° F. 2 Grams of ethanol, 2 grams of monoethanolamine and 4 grams of propylene glycol were then added. 26.7 Grams of $C_{12}$ linear alkylbenzene sulfonate (LAS) (sodium salt, 60% active) was then added to the mixing vessel. 8 Grams of $C_{12-13}$ alcohol ethoxylate having an average of 6.5 ethylene oxide units per molecule was thereafter added and the mixture was allowed to stir. The temperature was then raised to 110°–120° F. Following the temperature increase, 2 grams of coconut fatty acid, 5 grams of citric acid and 4 grams of sodium hydroxide (50% solution) were added to the mixture. The resulting material was a clear stable liquid. The properties of the composition prepared are presented in Table I and FIG. 2.

Unbuilt Heavy-Duty Liquid Detergent Formulation

Example 3

64 Grams of water were added to the mixing vessel and warmed to 90° F. 5 Grams of ethanol, 2 grams of monoethanolamine and 4 grams of propylene glycol were then added. 25 Grams of a product (96% active) consisting of $C_{12-13}$ alcohol ethoxylate having an average of 6.5 ethylene oxide units per molecule (AE) and secondary alkyl sulfate (SAS, sodium salt) in a 2:1 ratio of SAS to AE, was thereafter added and the mixture was allowed to stir. The resulting material was a clear stable liquid. The properties of the composition prepared are presented in Table I and FIG. 2.

Comparative Example C

Comparative Example C was carried out in a manner similar to Example 3, except that 54.3 grams of water were used, 26.7 grams of $C_{12}$ linear alkylbenzene sulfonate (LAS) (sodium salt, 60% active), and 8 grams of $C_{12-13}$ alcohol ethoxylate having an average of 6.5 ethylene oxide units per molecule were used in place of the secondary alkyl sulfate/alcohol ethoxylate blended product. The resulting material was a clear stable liquid. The properties of the composition prepared are presented in Table I and FIG. 2.

Light-Duty Liquid Detergent Formulation

Example 4

57.6 Grams of water were added to the mixing vessel and warmed to 120° F. 13.8 Grams of a product (96% active) consisting of $C_{12-13}$ alcohol ethoxylate having an average of 6.5 ethylene oxide units per molecule (AE) and $C_{14-17}$ secondary alkyl sulfate (SAS, sodium salt) in a 1:1 ratio of SAS to AE, 3.3 grams of $C_{12-13}$ alcohol ethoxylate having an average of 6.5 ethylene oxide units per molecule, 22 grams of $C_{12-15}$ alcohol ethoxysulfate (AES) (60% active matter, sodium salt), and 3.3 grams of Ninol® 49CE (coconut diethanolamide) were sequentially added to the water with good stirring and making sure that each ingredient was in solution before the next ingredient was added. The composition of the formulation is as follows: 6.6 percent by weight secondary alkyl sulfate (SAS), 9.9 percent by weight alcohol ethoxylate (AE), 13.2 percent by weight alcohol ethoxysulfate (AES), 3.3 percent by weight Ninol® 49CE and 67 percent by weight water.

Hard Surface Detergent Formulation

Example 5

75 Grams of water were added to the mixing vessel and warmed to 100° F. 4 Grams of sodium carbonate, 6 grams of tetrasodium ethylenediamine tetraacetate (EDTA, $Na_4$), 8 grams of sodium xylenesulfonate (SXS, 40% active), 3 grams of a product (95.2% active) consisting of $C_{12-13}$ alcohol ethoxylate having an average of 6.5 ethylene oxide units per molecule (AE) and $C_{13-14}$ secondary alkyl sulfate (SAS, sodium salt) in a 2.45:1 ratio of SAS to AE, and 4 grams of $C_{12-13}$ alcohol ethoxylate having an average of 6.5 ethylene oxide units per molecule, were sequentially added to the water with good stirring. The composition of the formulation is as follows: 2 percent by weight secondary alkyl sulfate (SAS), 4.8 percent by weight alcohol ethoxylate (AE), 4 percent by weight sodium carbonate, 6 percent by weight ethylenediamine tetraacetate (EDTA), 8 percent by weight sodium xylene sulfonate (40% active) and 75 percent by weight water.

Discussion of the Results and Detailed Description of the Drawings

As can be seen in FIG. 1, the dissolution (dispersion) rate of a heavy duty powder as it is added to water at 50° F. as detected via the solution turbidity as a function of time, as the solution is stirred. The heavy duty powder containing nonionic/secondary alkyl sulfate (Example 1) dissolved faster and more completely than the heavy duty powder containing primary alcohol sulfate (Comparative Example A), as observed by the lower turbidity (absorbance) profile and its return to the low turbidity level. The turbidity profile for the heavy duty powder containing primary alcohol sulfate was not dissolved (i.e., returned to a lower turbidity level), even after 20 minutes, which is a longer time than is typically found in the wash cycle of a washing machine in the United States.

Figure 2:
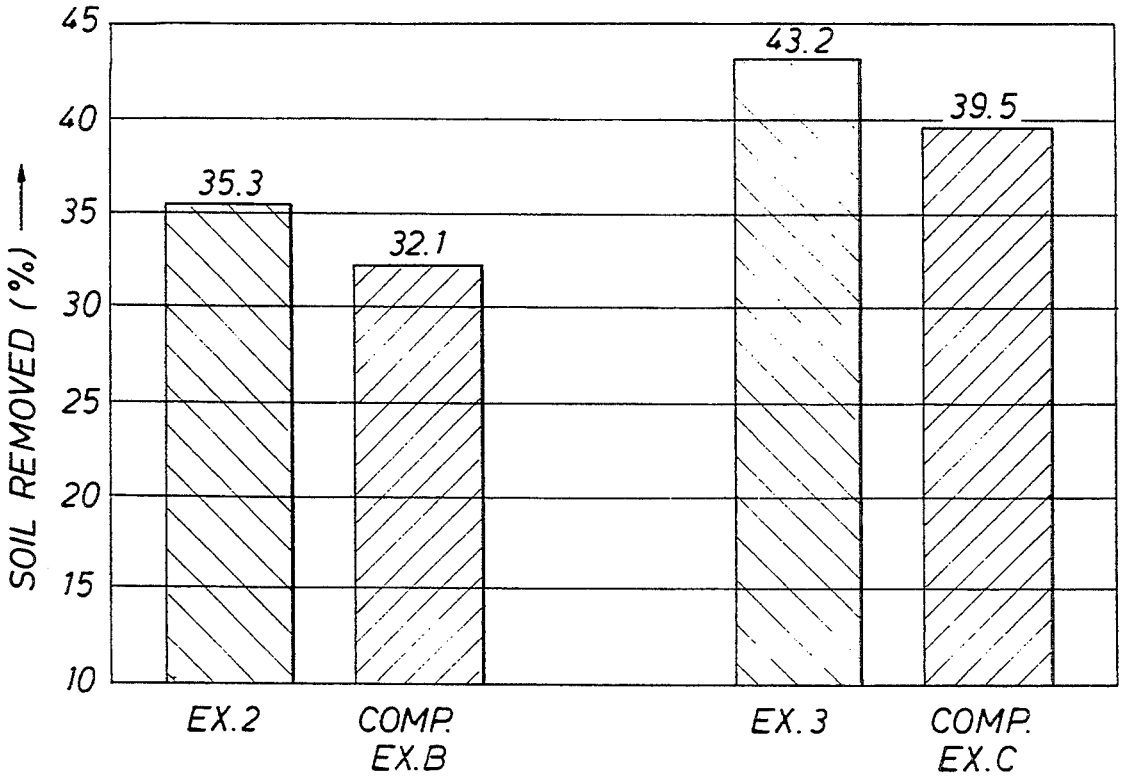
FIG. 2 represents the level of sebum soil which can be removed by a built liquid laundry detergent formulation containing a nonionic/secondary alkyl sulfate-containing surfactant composition, a built liquid laundry detergent formulation containing linear alkylbenzene sulfonate but no secondary alkyl sulfate, an unbuilt liquid laundry detergent formulation containing a nonionic/secondary alkyl sulfate-containing surfactant composition, and an unbuilt liquid laundry detergent formulation containing linear alkylbenzene sulfonate but no secondary alkyl sulfate, from a polyester/cotton fabric at a temperature of 100° F. and a water hardness level of 150 parts per million.

FIG. 2 represents the level of multisebum soil which is removed by both secondary alkyl sulfate-containing and non-secondary alkyl sulfate-containing formulations, built and unbuilt liquid laundry detergents from polyester/cotton fabric at a temperature of 100° F. and a water hardness level of 150 parts per million. The level of soil removed by the secondary alkyl sulfate-containing liquid laundry detergents (Examples 2 and 3) is higher than that obtained with liquid laundry detergents containing linear alkylbenzene sulfonate (comparative Examples B and C).

TABLE 1

Detergent Formulations Containing A Nonionic/Secondary Alkyl Sulfate (SAS) Surfactant Composition

| Component, % wt Basis 100% active unless otherwise indicated | Powdered Laundry Detergent | | Built Liquid Laundry Detergent | | Unbuilt Liquid Laundry Detergent | |
|---|---|---|---|---|---|---|
| | Ex. I | Comp. Ex. A | Ex. 2 | Comp. Ex. B | Ex. 3 | Comp. Ex. C |
| $C_{14-17}$ SAS | 7.5[a] | — | 16[b] | — | 16[b] | — |
| $C_{12}$ LAS (60%) | — | — | — | 26.7 | — | 26.7 |
| $C_{14-15}$ PAS (25%) | — | 30.0 | — | — | — | — |
| $C_{12-13}$ $EO_{6.5}$ | 7.51[a] | 7.5 | 8[b] | 8 | 8[b] | 8 |
| Coconut fatty acid | — | — | 2 | 2 | — | — |
| Citric acid | — | — | 5 | 5 | — | — |
| Monoethanol amine | — | — | 2 | 2 | — | — |
| Triethanol amine | — | — | — | — | 2 | 2 |
| Propylene glycol | — | — | 4 | 4 | 4 | 4 |
| Sodium hydroxide (50%) | — | — | 4 | 4 | — | — |
| Ethanol | — | — | 2 | 2 | 5 | 5 |
| Sodium carbonate | 84.4 | 85 | — | — | — | — |
| Water | — | — | 57 | 46.3 | 65 | 54.3 |
| Detergency[c] | — | — | 35.3 | 32.1 | 43.2 | 39.5 |

[a]Product (96% active) consisting of $C_{14-17}$ SAS (sodium salt) and $C_{12-13}$ $EO_{6.5}$ at a 1:1 SAS:AE ratio.
[b]Same as above but 2:1 SAS:AE ratio.
[c]Temperature 100 F., 150 ppm water hardness. Radiolabeled sebum soil removal from permanent press (65/35) polyester/cotton was determined as described in "Detergency. Theory and Technology", G. W. Cutler and E. Kissa, eds., Surfactant Science Series, Vol. 20, p. 125 (1987) and N. Prieto, J. Am. Oil Chem. Soc. 66 10 (1989). All examples and comparative examples were tested at a dose of 2 grams/liter. Results are expressed as percent soil removed.

What is claimed is:

1. A detergent formulation which comprises a surfactant composition which comprises between about 0.1 percent by weight and about 56 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and between about 0.1 percent by weight and about 60 percent by weight, basis the total weight of the surfactant composition, of one or more secondary alkyl sulfate compounds.

2. A powdered laundry detergent formulation which comprises from about 2 percent by weight to about 50 percent by weight, basis the total weight of the powdered detergent formulation, of a nonionic/secondary alkyl sulfate-containing surfactant composition comprising from about 2 percent by weight to about 56 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and from about 2 percent by weight to about 60 percent by weight, basis the total weight of the surfactant composition, of one or more secondary alkyl sulfate compounds, and from about 25 percent by weight to about 85 percent by weight, basis the total weight of the powdered detergent formulation, of one or more detergent builders.

3. The powdered laundry detergent formulation of claim 2 wherein said formulation additionally comprises from about 2 percent by weight to about 50 percent by weight, basis the total weight of the formulation, of one or more filler compounds.

4. The powdered laundry detergent formulation of claim 2 wherein said formulation additionally comprises from about 1 percent by weight to about 12 percent by weight, basis the total weight of the formulation, of one or more bleach compounds.

5. The powdered laundry detergent formulation of claim 2 wherein said formulation additionally comprises from about 2 percent by weight to about 25 percent by weight of an additional surfactant compound selected from the group consisting of nonionic surfactants, anionic surfactants, cationic surfactants, zwitterionic surfactants and mixtures thereof.

6. A liquid laundry detergent formulation which comprises from about 2 percent by weight to about 42 percent by weight, basis the total weight of the liquid laundry detergent formulation, of a nonionic/secondary alkyl sulfate-containing surfactant composition comprising from about 2 percent by weight to about 40 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, from about 2 percent by weight to about 59.5 percent by weight, basis the total weight of the surfactant composition, of one or more secondary alkyl sulfate compounds, up to about 15 percent by weight, basis the total weight of the liquid laundry detergent formulation, of one or more cosurfactant compounds, up to about 20 percent by weight, basis the total weight of the liquid laundry detergent formulation, of one or more detergent builders, and from about 35 percent by weight to about 80 percent by weight, basis the total weight of the liquid laundry detergent formulation, of one or more solvents.

7. The liquid laundry detergent formulation of claim 6 wherein said cosurfactant compound is selected from the group consisting of nonionic surfactants, anionic surfactants, cationic surfactants, zwitterionic surfactants and mixtures thereof.

8. The liquid laundry detergent formulation of claim 6 wherein said formulation additionally comprises from about 0.1 percent by weight to about 5 percent by weight, basis the total weight of the formulation, of one or more enzymes.

9. The liquid laundry detergent formulation of claim 9 wherein said formulation additionally comprises from about 0.5 percent by weight to about 5 percent by weight, basis the total weight of the formulation, of one or more enzyme stabilizers.

10. A light-duty liquid detergent formulation which comprises from about 1 percent by weight to about 35 percent by weight, basis the total weight of the light-duty liquid detergent formulation, of a nonionic/-secondary alkyl sulfate-containing surfactant composition comprising from about 1 percent by weight to about 43 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and from about 1 percent by weight to about 51 percent by weight, basis the total weight of the surfactant composition, of one or more secondary alkyl sulfate compounds, from about 1 percent by weight to about 15 percent by weight, basis the total weight of the light-duty liquid detergent formulation, of one or more suds stabilizers, and from about 50 percent by weight to about 98 percent by weight, basis the total weight of the light-duty liquid detergent formulation, of water.

11. The light-duty liquid detergent formulation of claim 10 wherein said formulation additionally comprises an anionic surfactant selected from the group consisting of alkenyl carboxysulfonates, methylester sulfonates, alcohol ethoxysulfates, linear alkylbenzene sulfonates, alpha olefin sulfonates, and mixtures thereof.

12. A hard surface cleaning formulation which comprises from about 0.1 percent by weight to about 40 percent by weight, basis the total weight of the hard surface cleaning formulation, of a nonionic/secondary alkyl sulfate-containing surfactant composition comprising from about 0.1 percent by weight to about 37.5 percent by weight, basis the total weight of the surfactant composition, of one or more nonionic surfactants selected from the group consisting of alcohol ethoxylate surfactants and alkyl-substituted phenol ethoxylate surfactants having an average of between about 3 and about 12 ethylene oxide units per ethoxylate molecule, and from about 0.1 percent by weight to about 52.5 percent by weight, basis the total weight of the surfactant composition, of one or more secondary alkyl sulfate compounds, and from about 60 percent to about 98 percent by weight, basis the total weight of the hard surface cleaning formulation, of water.

13. The hard surface cleaning detergent formulation of claim 12 wherein said formulation additionally comprises from about 2 percent by weight to about 25 percent by weight of a cosurfactant compound selected from the group consisting of nonionic surfactants, anionic surfactants, cationic surfactants, zwitterionic surfactants and mixtures thereof.

14. The hard surface cleaning detergent formulation of claim 12 wherein said formulation additionally comprises from about 0.1 percent by weight to about 19 percent by weight, basis the total weight of the formulation, of one or more detergent builder compounds.

* * * * *